United States Patent
Solans Artigas et al.

(10) Patent No.: US 11,510,409 B2
(45) Date of Patent: Nov. 29, 2022

(54) FUNGICIDE COMPOSITION FOR TREATING THE BANANA AND/OR PLANTAIN TREE

(71) Applicant: DESARROLLO AGRICOLA Y MINERO, S.A., Saragossa (ES)

(72) Inventors: Carlos Solans Artigas, Saragossa (ES); Eitan Martin Oro, Saragossa (ES)

(73) Assignee: DESARROLLO AGRICOLA Y MINERO, S.A., Saragossa (ES)

( * ) Notice: Subject to any disclaimer, the term of this patent is extended or adjusted under 35 U.S.C. 154(b) by 275 days.

(21) Appl. No.: 16/495,058

(22) PCT Filed: Jul. 12, 2017

(86) PCT No.: PCT/ES2017/070509
§ 371 (c)(1),
(2) Date: Sep. 17, 2019

(87) PCT Pub. No.: WO2018/172572
PCT Pub. Date: Sep. 27, 2018

(65) Prior Publication Data
US 2020/0267975 A1    Aug. 27, 2020

(30) Foreign Application Priority Data

Mar. 21, 2017   (ES) .................... 201730391

(51) Int. Cl.
*A01N 31/04* (2006.01)
*A01N 25/02* (2006.01)

(52) U.S. Cl.
CPC ............. *A01N 31/04* (2013.01); *A01N 25/02* (2013.01)

(58) Field of Classification Search
CPC ........ A01N 31/04; A01N 25/02; A01N 25/30; A01N 31/06
See application file for complete search history.

(56) References Cited

U.S. PATENT DOCUMENTS

2013/0018107 A1   1/2013   Belkind et al.
2014/0271950 A1   9/2014   Mora et al.

FOREIGN PATENT DOCUMENTS

| CN | 101999396 A | * | 4/2011 | |
|---|---|---|---|---|
| ES | 2328322 A1 | | 11/2009 | |
| FR | 2529755 A1 | | 1/1984 | |
| IN | 201402001 | | 7/2014 | |
| WO | 2012076717 A1 | | 6/2012 | |
| WO | 2014092999 A1 | | 6/2014 | |
| WO | WO-2018116027 A1 | * | 6/2018 | ............. A01N 31/02 |

OTHER PUBLICATIONS

Eduardo Gutierrez Jiminez, "Efecto in vitro De Aceites Esenciales Sobre El Crecimiento De Mycosphaerella fijiensis Morelet Y Detección Molecular De Principios Activos", published Dec. 21, 2016, obtained at https://issuu.com/eduardogutierrezjimenez/docs/tesis_mc_eduardo_guti_rrez_j (Year: 2016).*
International Search Report for corresponding PCT application No. PCT/ES2017/070509, dated Oct. 17, 2017.

* cited by examiner

*Primary Examiner* — Mina Haghighatian
*Assistant Examiner* — Nathan W Schlientz
(74) *Attorney, Agent, or Firm* — Notaro, Michalos & Zaccaria P.C.

(57) ABSTRACT

A fungicidal composition for the treatment of banana and/or plantain plants is presented, the active ingredient of which is cinnamic aldehyde, combined with terpene alcohols, ethoxylated castor oil, C11-13 alcohols, and calcium alkyl aryl sulfonate solution. The main advantages of the invention described herein are that the composition demonstrates high efficacy against Sigatoka in banana and/or plantain plants, great stability over time, and very low toxicity.

15 Claims, No Drawings

FUNGICIDE COMPOSITION FOR TREATING THE BANANA AND/OR PLANTAIN TREE

As the title indicates, this description relates to a composition with fungicidal phytosanitary properties for the treatment of banana and/or plantain plants, especially for the disease known as Sigatoka, characterized in that its active ingredient is cinnamic aldehyde combined with terpene alcohol.

FIELD OF THE INVENTION

The invention relates to the field of phytosanitary or plant health products for banana and/or plantain plants.

THE PRIOR ART

A series of definitions are established within the scope of this description to enable clearer understanding:

Sigatoka: A disease caused by the fungus of genus *Mycosphaerella* in banana and/or plantain plants. Where the term Sigatoka is used in this description, it is understood to encompass the various types of Sigatoka, such as black Sigatoka and yellow Sigatoka.

Black Sigakoka: A disease caused by the fungus *Mycosphaerella fijensis* in banana and/or plantain plants.

Yellow Sigatoka: A disease caused by the fungus *Micosphaerella musicola* in banana and/or plantain plants.

Cinnamic aldehyde: An organic compound whose IUPAC name is (2E)-3-phenylprop-2-enal but which also bears other names such as cinnamic aldehyde or cinnamaldehyde, whose empirical formula is C6H5CHCHCOH and molecular formula is C9H8O. This compound can be obtained from natural sources or by chemical synthesis.

Ethoxylated castor oil: The castor oil obtained by reacting with ethylene oxide in an ethoxylation reaction. The various ethoxylated castor oil are classified according to the number of moles of ethylene or degree of ethoxylation.

Ethoxylated castor oil with a low degree of ethoxylation. Ethoxylated castor oil with an ethoxylation degree between 5 and 20 moles.

Ethoxylated castor oil with a high degree of ethoxylation. Ethoxylated castor oil with an ethoxylation degree greater than 20 moles.

Calcium alkyl aryl sulfonate solution: A liquid produced by dissolving calcium alkyl aryl sulfonate at a final concentration of between 45% and 70% weight/weight in a solvent.

C11-C13 Alcohols: A liquid product with a minimum content of 80% weight/weight in ethoxylated branched C11-C13 alcohols with >2.5 EO and characterized in that their CAS number is: 68439-54-3.

Terpene alcohol: In this description the term terpene alcohol is understood as the liquid product constituted mostly (more than 80% weight/weight) by a single monoterpene alcohol such as α-terpineol, or the multi-constituent mixture of terpene alcohols obtained essentially by monocyclic terpene alcohols (terpineols, 1-terpinen-4-ol, etc.) and a smaller proportion of tri-cyclic terpene alcohols (fenchol, borneol, etc.).

Black Sigatoka is the foliar disease caused by the *Mycosphaerella* fungus that accounts for the main limitation in the production of musaceae (banana and plantain plants) worldwide. The disease affects the photosynthetic leaf area of the plant and, consequently, bunches and fruit are of lower weight compared to healthy plants. Additionally, severe Sigatoka infections also cause premature ripening of the fruit.

At present and as far as our knowledge goes, there exists a limited number of chemical synthesis, natural or microbiological plant health products to control this disease worldwide. This has given rise to the onset of resistance by the fungus against treatment using these products and which leads to combinations of these phytosanitary products having to be used, as well as to the appearance of high levels of phytosanitary residue in the fruit and to poor control of Sigatoka, with the consequent economic losses. Therefore, if new fungicides could be found whose composition is highly effective and which also contribute to an improvement in toxicology, application safety and a decrease in or absence of residues, very significant environmental and economic gains could be achieved for this crop.

BACKGROUND OF THE INVENTION

The use of botanical substances or their chemical twins with anti-microbial properties is reported in several patents and scientific publications. Indeed, patent WO2014092999A1 uses a composition as a biocide for use in humans that, among other substances, includes cinnamic aldehyde, although the concentrations of that substance are very different and it is not used for either agriculture, phytosanitary applications or the crops referred to herein.

Likewise, patent FR2529755 is found to describe a compound in which the active ingredient is cinnamic aldehyde to treat infection by pathogenic microbes in plants. The composition is said to be suitable for use in the treatment of infection by Botrytis cinerea, Sphaeratheca humuli, Coricium rolgsii, Fusarium, Pythium Rhizoctonia and Phytophthora P. capsici. The composition described therein is very different and its effectiveness for the proposed purposes such as with *Mycosphaerella* is not categorized either.

Furthermore, patent ES2328322 describes compositions for treating post-harvest infections caused by pathogens in fruits and vegetables that comprise a primary active ingredient consisting of a mixture of thymol, eugenol and cinnamic aldehyde, and a secondary active ingredient consisting of a mixture of cuminaldehyde, geraniol, vanillin, borneol, menthol, acetol, terpineol, limonene and glycosides of mustard and jasmine essences. In that application, the effect of several compositions was tested but not specifically for uses during crop production, or against banana and/or plantain diseases or Sigatoka disease. Once again, the compositions defined therein are radically different from the one presented here.

Likewise, in the work published by Madriz Guzmán, A. et al.; "In vitro and field effect of methyl esters of castor bean, palm and soybean oils on *Mycosphaerella fijiensis*, the causative agent of black Sigatoka in banana plants (Musa AAA)" CORBANA 2008 Vol. 34 No. 61 pp. 11-27, the use of methyl esters of vegetable oils (castor bean, palm and soybean) in fungicidal compositions for the treatment of black Sigatoka is described. These derivatives of vegetable oils constitute an alternative to mineral oils. The fungicide used in the tests described in our work is bitertanol.

Zhou, H. et al.'s paper entitled "Antifungal activity of citral, octanal and α-terpineol against Geotrichum citri-aurantii"; Food Control, Volume 37, March 2014, Pages 277-283 describes the antifungal properties of citral, octanal and α-terpineol on Geotrichum citri-aurantii. The effectiveness of these compounds for treating infections by this fungus is assessed and the paper states that these compounds cause a loss of fungii membrane integrity and a loss of cytoplasmic content.

Within the same realm of biocide studies, the publication "Assessment of the effect on black Sigatoka on separate Cavendish (Williams variety) banana plant leaves of the extract of *Melaleuca alternifolia* in 3 areas of the Ecuadorian coastline"; Escuela Superior Politécnica del Litoral, 2011 by Tumbaco Vera, J. describes the effect of an extract of *Melaleuca alternifolia* on the treatment of black Sigatoka. This extract has anti-fungal properties that combat the fungus responsible for black Sigatoka. The extract comprises α-terpineol and other compounds. However, the active materials described do not match those defined in the description herein.

Further products can also be found, such as the one described in patent IN201402001, which claims a fungicidal and bactericidal product to combat various pathogens that affect plants. The product can be applied in the treatment of fungal infections by *Fusarium* spp., *Sclerotinia rolfsii* spp., *Botritys* spp., *Aspergillus* spp., *Alternaria* spp., *Cercospora* spp. and *Mycosphaerella* spp. In this case, the composition can be applied specifically to the banana plant for the treatment of black Sigatoka. The composition comprises a 7-15% weight/volume concentration of cinnamic aldehyde, 7-15% weight/volume of eugenol, plus a solvent and vehicle. The paper describes the results obtained on cumin and indicates that the most toxic compound for pathogenic fungi is cinnamic aldehyde. The paper also indicates that a synergistic effect exists between cinnamic aldehyde and eugenol. However, it does not describe the use of terpene alcohols or the rest of the excipients contained in the composition of the invention, and its effectiveness is not overly remarkable.

As seen, the literature reveals no references that describe the combined use of cinnamic aldehyde and terpene alcohol, nor specifically for the treatment of Sigatoka in banana and/or plantain plants.

DESCRIPTION OF THE INVENTION

To overcome the problem currently existing in the cultivation of banana and/or plantain plants by improving the state of the art, a fungicidal composition for treating banana and/or plantain plants, which is the object of the invention presented herein, has been devised, which includes cinnamic aldehyde as its active ingredient, combined with ethoxylated castor oil, C11-13 alcohols, calcium alkyl aryl sulfonate solution and terpene alcohols.

Cinnamic aldehyde is the active ingredient providing the fungicidal properties and which is combined with terpene alcohols in a compound to improve product application, its resistance on banana plant leaves, and its effectiveness.

The composition is formulated as an emulsifiable concentrate from which liquid formulations of fungicides can be prepared to treat Sigatoka in banana and/or plantain plants. It is preferably delivered by aerial spraying but is also appropriate for land application using manual sprayers, motor pumps, or other similar means.

Advantages of the Invention

The fungicidal composition for the treatment of banana plants presented herein provides numerous advantages over currently available systems, the most significant of which is that it is highly effective against Sigatoka in banana and/or plantain plants, compared to other chemical or natural synthetic products that are currently in use on banana and/or plantain plants.

The composition's toxicological profile is very positive by international standards compared to other chemical synthesis products, thanks to the use of cinnamic aldehyde as the active ingredient. This means this composition can be declared to be free of phytosanitary residues, with the clear agricultural, sanitary and economic benefits over synthetic products that entails.

In addition, it should be noted that this fungicidal composition does not include anti-oxidants, as is the norm in other compositions with similar substances. This is due to the fact that, with the composition used in this invention, the structure is maintained and the degradation of the active ingredient by oxidation is prevented, resulting in a stable product, defined according to international standards for this type of product. In consequence, incorporating anti-oxidant substances that can act as contaminants or may increase the toxicity or phytotoxicity of the composition is avoided.

Another important advantage is that it includes terpene alcohols. The incorporation of terpene alcohols increases efficiency in terms of product application, since they help to keep the substance on the banana and/or plantain plant leaves, even withstanding rain.

Apart from facilitating application, terpene alcohols also reduce the amount of mineral oil that needs to be added, thereby significantly reducing the toxicity produced by such oils in the cultivation of banana and/or plantain plants.

Another advantage of the present composition in addition to the benefits already expounded in terms of its improved toxicological profile, presumable absence of residues, absence of anti-oxidant substances that may act as contaminants, improvement in product application, greater efficiency, or decreased toxicity of other application media is that it is economically competitive compared to traditional chemical phytosanitary products.

PREFERRED EMBODIMENT OF THE INVENTION

The fungicidal composition for treating banana plants presented in this invention basically comprises:
cinnamic aldehyde,
a mixture of ethoxylated castor oils with a high degree of ethoxylation,
ethoxylated castor oil with a low degree of ethoxylation
C11-13 alcohols,
terpene alcohols and
calcium alkyl aryl sulfonate in solution.

The proportion of cinnamic aldehyde comprises between 20% and 55% by weight, preferably 30-40% by weight of the total weight of the composition.

The mixture of ethoxylated castor oils comprises at least two ethoxylated castor oils with a high degree of ethoxylation. The degree of ethoxylation of these oils is between 20 and 40 moles, preferably between 30 and 40 moles, and more preferably selected from among the group consisting of 35, 36 and 40 moles. The proportion of the mixture of ethoxylated castor oils with a high degree of ethoxylation is between 20% and 40% by weight, preferably between 25% and 35% by weight of the total weight of the composition.

In addition, at least one ethoxylated castor oil with a low degree of ethoxylation is used. The ethoxylation degree of this oil is between 5 and 20 moles, preferably between 8 and 15 moles, or even more preferably, selected from the group consisting of 9 and 10 moles. The proportion of this ethoxylated castor oil with a low degree of ethoxylation is between 0.4% and 2% by weight, preferably between 0.5% and 1% by weight of the total weight of the composition.

The proportion of C11-13 alcohols is between 25% and 40%, preferably between 30% and 35% by weight of the total weight of the composition.

The proportion of terpene alcohols, for example α-terpineol, in the composition lies between 5% and 10% by weight, preferably between 6% and 8% by weight of the total weight of the composition.

The proportion of calcium alkyl aryl sulfonate solution is between 1% and 5% by weight, preferably between 1.5% and 2% by weight of the total weight of the composition.

Application Conditions and Results Obtained Experimentally in the Field

Comparative studies under commercial conditions were carried out to demonstrate the effectiveness of the invention described herein. Thus, the preferred means of commercial application of the present fungicidal composition is by aerial spraying, although it is also possible to land spray using manual sprayers, motor pumps, or other similar means. The invention is further characterized by a specific use, with a product application dose of between 0.5 l/ha and 4 l/ha, and preferably of between 1 l/ha and 1.5 l/ha of the composition described herein.

Preparation of the spraying stock follows the same conditions as those commonly used for banana and/or plantain plants. The following examples illustrate a scenario of aerial spraying, the difference between them being whether the application includes mineral oil or not:

Example 1: Application with Mineral Oil

Application stock volume in the field: 20-25 l/ha
Components:
Mineral oil: 2-10 l/ha.
Emulsifier: at 1% of the amount of mineral oil.
Phytosanitary products or foliar fertilizers.
Composition in this description: 0.5 to 4 l/ha
Remainder: water

Example 2: Application with No Mineral Oil

Application stock volume in the field: 20-25 l/ha
Components:
Phytosanitary products or foliar fertilizers
Composition in this description: 0.5 to 4 l/ha
Remainder: water With these conditions and doses, the composition in this description demonstrates 100% inhibition of the germination of Sigatoka ascospores, as shown in the in vitro results performed in laboratories in accordance with international methods.

Equally with these conditions and doses, the composition presented herein reveals agronomic results against Sigatoka of the same order or higher than listed chemical or natural products used for this same purpose.

A person skilled in the art will easily comprehend that the characteristics of different embodiments can be combined with the characteristics of other possible embodiments, provided that the combination is technically possible.

All of the information referring to examples or embodiments form part of the description of the invention.

The invention claimed is:

1. Fungicidal composition for the treatment of banana and/or plantain plants, characterized in that it comprises:

cinnamic aldehyde in a proportion of between 20% and 55% by weight with respect to the total weight, a mixture of ethoxylated castor oils with a high degree of ethoxylation in a proportion of between 20% and 40% by weight with respect to the total weight, ethoxylated branched C11-13 alcohols with >2.5 EO in a proportion of between 25% and 40% by weight with respect to the total weight, terpene alcohols in a proportion of between 5% and 10% by weight with respect to the total weight, calcium alkyl aryl sulfonate solution in a proportion of between 1% and 5% by weight with respect to the total weight, and ethoxylated castor oil with a low degree of ethoxylation, in a proportion of between 0.4% and 2% by weight with respect to the total weight.

2. Fungicidal composition for the treatment of banana and/or plantain plants according to claim 1 characterized in that the cinnamic aldehyde is in a proportion of between 30% and 40% by weight with respect to the total weight of the composition.

3. Fungicidal composition for the treatment of banana and/or plantain plants according to claim 1 characterized in that the mixture of ethoxylated castor oils with a high degree of ethoxylation is a mixture of at least two ethoxylated castor oils with a degree of ethoxylation of between 20 and 40 moles.

4. Fungicidal composition for the treatment of banana and/or plantain plants according to claim 1 characterized in that the mixture of ethoxylated castor oils with a high degree of ethoxylation is a mixture of at least two ethoxylated castor oils with a degree of ethoxylation of between 30 and 40 moles.

5. Fungicidal composition for the treatment of banana and/or plantain plants according to claim 1 characterized in that the mixture of ethoxylated castor oils with a high degree of ethoxylation is a mixture of at least two ethoxylated castor oils with a degree of ethoxylation selected from the group formed by 35, 36 and 40 moles.

6. Fungicidal composition for the treatment of banana and/or plantain plants according to claim 1 characterized in that the ethoxylated castor oil with a low degree of ethoxylation has a degree of ethoxylation of between 5 and 20 moles.

7. Fungicidal composition for the treatment of banana and/or plantain plants according to claim 1 characterized in that the ethoxylated castor oil with a low degree of ethoxylation has a degree of ethoxylation of between 8 and 15 moles.

8. Fungicidal composition for the treatment of banana and/or plantain plants according to claim 1 characterized in that the ethoxylated castor oil with a low degree of ethoxylation has a degree of ethoxylation selected from the group formed by 9 and 10 moles.

9. Fungicidal composition for the treatment of banana and/or plantain plants according to claim 1 characterized in that the mixture of ethoxylated castor oils with a high degree of ethoxylation is in a proportion of between 25% and 35% by weight of the total weight of the composition.

10. Fungicidal composition for the treatment of banana and/or plantain plants according to claim 1 characterized in that the ethoxylated branched C11-13 alcohols with >2.5 EO are in a proportion of between 30% and 35% by weight of the total weight of the composition.

11. Fungicidal composition for the treatment of banana and/or plantain plants according to claim 1 characterized in that the terpene alcohols are in a proportion of between 6% and 8% by weight with respect to the total weight of the composition.

12. Fungicidal composition for the treatment of banana and/or plantain plants according to claim 1 characterized in that the calcium alkyl aryl sulfonate solution is in a proportion of between 1.5% and 2% by weight with respect to the total weight of the composition.

13. Fungicidal composition for the treatment of banana and/or plantain plants according to claim 1 characterized in that the ethoxylated castor oil with a low degree of ethoxylation is in a proportion of between 0.5% and 1% by weight of the total weight of the composition.

14. A method of treating banana and/or plantain plants comprising the steps of:
    providing a fungicidal composition for the treatment of banana and/or plantain plants, comprising,
        cinnamic aldehyde in a proportion of between 20% and 55% by weight with respect to the total weight,
        a mixture of ethoxylated castor oils with a high degree of ethoxylation in a proportion of between 20% and 40% by weight with respect to the total weight,
        ethoxylated branched C11-13 alcohols with >2.5 EO alcohols in a proportion of between 25% and 40% by weight with respect to the total weight,
        terpene alcohols in a proportion of between 5% and 10% by weight with respect to the total weight,
        calcium alkyl aryl sulfonate solution in a proportion of between 1% and 5% by weight with respect to the total weight, and
        ethoxylated castor oil with a low degree of ethoxylation, in a proportion of between 0.4% and 2% by weight with respect to the total weight,
    applying a dosage of the fungicidal composition to a plant in need thereof,
    wherein the dosage is between 0.5 l/ha and 4 l/ha.

15. A method of treating banana and/or plantain plants, comprising the steps of:
    providing a fungicidal composition for the treatment of banana and/or plantain plants, comprising,
        cinnamic aldehyde in a proportion of between 20% and 55% by weight with respect to the total weight,
        a mixture of ethoxylated castor oils with a high degree of ethoxylation in a proportion of between 20% and 40% by weight with respect to the total weight,
        ethoxylated branched C11-13 alcohols with >2.5 EO in a proportion of between 25% and 40% by weight with respect to the total weight,
        terpene alcohols in a proportion of between 5% and 10% by weight with respect to the total weight,
        calcium alkyl aryl sulfonate solution in a proportion of between 1% and 5% by weight with respect to the total weight, and
        ethoxylated castor oil with a low degree of ethoxylation, in a proportion of between 0.4% and 2% by weight with respect to the total weight,
        wherein the ethoxylated C11-13 alcohols with >2.5 EO are in a proportion of between 30% and 35% by weight of the total weight of the composition
    applying a dosage of the fungicidal composition to a plant in need thereof,
    wherein the dosage is between 1 l/ha and 1.5 l/ha.

* * * * *